United States Patent [19]

Ishikawa et al.

[11] Patent Number: 4,496,513
[45] Date of Patent: Jan. 29, 1985

[54] TUBULAR CONTAINER MOLDING METHOD AND APPARATUS

[75] Inventors: Tatsuo Ishikawa, Chiba; Yoshiharu Hatakeyama, Tokyo, both of Japan

[73] Assignee: Yoshida Industry Co., Ltd., Tokyo, Japan

[21] Appl. No.: 497,012

[22] Filed: May 23, 1983

[30] Foreign Application Priority Data

May 25, 1982 [JP]  Japan .................................. 57-87265

[51] Int. Cl.³ ........................ B29C 5/00; B29D 31/00; B29F 1/10
[52] U.S. Cl. ...................................... 264/267; 249/83; 249/124; 264/339; 425/112; 425/117; 425/127; 425/129 R
[58] Field of Search ............... 425/126 R, 127, 129 R, 425/112, 117; 264/DIG. 41, 268, 266, 267, 339, 269, 259, 271.1, 320; 249/83, 124

[56] References Cited

U.S. PATENT DOCUMENTS

| 2,386,498 | 10/1945 | Ostrander | 264/DIG. 41 |
| 2,485,885 | 10/1949 | Hoopes | 264/DIG. 41 |
| 3,074,837 | 1/1963 | Flax | 264/DIG. 41 |
| 3,330,006 | 7/1967 | Jenkins | 264/DIG. 41 |

Primary Examiner—Willard E. Hoag
Attorney, Agent, or Firm—Wenderoth, Lind & Ponack

[57] ABSTRACT

A tubular container molding method includes the steps of inserting a core block having an upwardly projected annular flange at the top end into a preformed tubular member, closing the mold and thereby pressing an upper marginal portion of the tubular member against a cavity mold and bending inwardly such upper marginal portion to form a shoulder portion of the container, urging the inwardly bent marginal portion against an interior surface of the cavity mold by the annular flange to hold the shoulder portion between the core block and the cavity mold, and injecting molten resin into an air gap defined between the core block and the cavity mold, thereby molding conical and neck portions of the container integrally with the shoulder portion.

2 Claims, 4 Drawing Figures

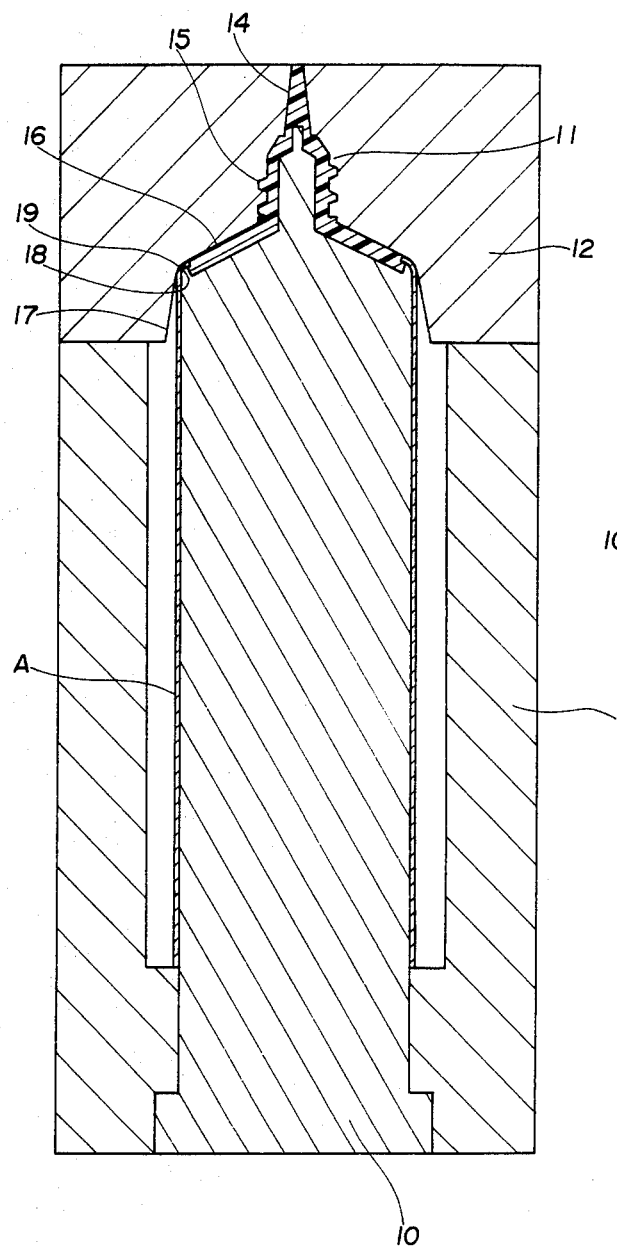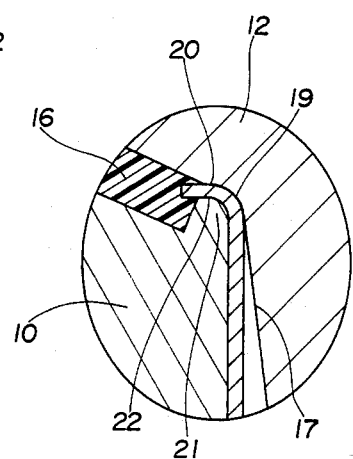

TUBULAR CONTAINER MOLDING METHOD AND APPARATUS

BACKGROUND OF THE INVENTION

The present invention relates to a method and an apparatus for molding a tubular container and, more particularly, to a method and apparatus for molding such a tubular container that its preformed body is formed as a unitary structure with its conical and neck portion.

A synthetic resin made tubular container is usually formed of pliable resin, such as of the olefine series, and hence has the excellent property of permitting a proper quantity of its contents to be squeezed out very easily by pressing the container body with fingers of a user. Tubular containers of this kind are widely used for liquid or pasty materials.

Generally, there are two types of methods for molding such a tubular container. One method is to mold the body and the conical and neck portions into a unitary structure by extrusion blow molding or injection extrusion molding. The other method is to fuse the conical portion with a preformed body portion by injection molding.

With the former method, however, it is impossible to employ a laminated structure for the tubular body portion to add thereto a decorative touch, and it is difficult to control the transparency of the container itself and to form the tubular container with a uniform thickness. Furthermore, the surface of the tubular container is roughened so that no decoration can be effected by offset printing or hot stamping. Due to such fatal defects, this method is not employed for molding of cosmetics containers that are required to give a beautiful or gorgeous appearance and, at present, it is merely used for miscellaneous goods, for instance, paste containers.

The latter molding method is free from such defects as mentioned above but possesses the following drawback. That is, since the contents of the tubular container, such as liquid or pasty cosmetics or the like, are squeezed out therefrom by pressing the tubular body with the fingers of the user, the container has applied thereto external and internal stresses for compressive deformation and this sometimes causes cracking of the container shoulder portion joining the container body and conical portion, resulting in leakage of the content.

Moreover, the latter molding method is accomplished by the use of a molding apparatus such as shown in FIG. 1, which comprises a cylindrical core block 1 for defining the interior of the container, a cavity mold 4 disposed on top of the core block 1 for forming therebetween a conical portion 2 and a neck portion 3 of the container, and a core clamping block 5. The inner wall of the lower end portion of the container shoulder forming part of the cavity mold 4 has a vertical surface 6 to define a cylindrical space having a diameter a little larger than that of the container body A, and a guide portion 7 of the cavity mold 4 is spread out downwardly from the lower end of the vertical wall 6. For molding the tubular container through the use of this molding apparatus, the core block 1 is inserted into the tubular member A performed by extrusion or the like as the container body, the core block 1, the cavity mold 4 and the core clamping block 5 are positioned as shown in FIG. 1, and resin is injected in the direction of the arrow through a molten resin injecting runner 8 provided at the top of the cavity mold 4, thus molding the container conical and neck portions B and C as a unitary structure with the tubular member A.

With such a molding method, while the molten resin is pressurized for injection from the runner 8 to form the conical portion B and the neck portion C, the tubular body A is merely held between the vertical inner wall surface 6 of the cavity mold 4 and the cylindrical core block 1, so that when the molten resin injection pressure is raised, the molten resin flows into a narrow space between the tubular body A and the core block 1. In this case, if the injected resin flows down the core block 1 nonuniformly, then the lower end of the resin does not become level but forms a wavy curve X as shown in FIG. 2. In the case where the container body A is formed of a transparent or translucent resin, such a wavy curve can be clearly seen from the outside and markedly ruins the appearance of the container, giving the impression that not only the container itself but also its contents are cheap.

With the recent trend to diversification, there is also a strong and growing demand for a tubular container the neck and conical portions of which are opaque but the body of which is transparent or translucent so that the contents can be seen therethrough. In this case, the aforementioned wavy curve formed by the lower end of the injected resin becomes more noticeable, and hence there is a strong demand to avoid such occurrence. For preventing the formation of the wavy curve, there has been proposed a method of injecting a fixed quantity of resin for packing into the cavity mold. With this method, however, there is the strong fear of underpacking of the resin and, further, since the injection pressure cannot be raised high, the adhesive strength between the conical portion and the shoulder portion of the container body is reduced. Moreover, in the case of molding a number of tubular containers at a time, the packing rate and the internal pressure of the resin vary largely, further introducing a factor for unstable molding. Accordingly, the use of such a method prevents the formation of the wavy curve but inevitably leads to nonuniformity in the quality of moldings and lowered productivity.

With such a background, the present invention has been made to solve the abovementioned problems of the prior art.

Therefore, it is an object of the present invention to provide an extremely advantageous tubular container molding method and apparatus with which it is possible, without lowering productivity and impairing the adhesive strength between the shoulder and conical portions of the container, to remove the wavy curve which appreciably ruins its appearance and which is impossible with the conventional molding methods to remove.

SUMMARY OF THE INVENTION

According to the present invention, a tubular container molding method is provided in which a substantially cylindrical core block is used for defining the interior of a container, a cavity mold is disposed on the top of the core block to define container conical and neck portion molding sections in an air gap between the top end portion of the core block and the cavity mold. The core block has an upwardly projected annular flange at the top end therof and is inserted into a synthetic resin made tubular member preformed as a container body to have a predetermined length and diameter. At the time of closing the mold, an upper marginal portion of the tubular member is pressed against the cavity mold and this is inwardly bent to form a shoulder portion of the container, and then the inwardly bent marginal portion is urged by the annular flange of the core block against the interior surface of the cavity mold to hold the shoulder portion between the core block and the cavity mold. Then, molten resin fusible with the material of the tubular member is injected into the air gap to soften the shoulder portion by the heat of the molten resin, thereby molding conical and neck portions of the container integrally with the shoulder portion. After cooling the molten resin, the core block and the cavity mold are separated from each other.

For carrying out the above method, a tubular container molding apparatus is employed which comprises a substantially cylindrical core block for defining the interior of a container and a cavity mold disposed on the top of the core block to define container conical and neck portion molding sections in an air gap into which molten resin is to be injected. The interior surface of the cavity mold defining the container conical portion molding section is gently sloped and a steeply sloping guide surface is formed to continuously extend from the lower edge of the gentle slope. An annular flange is raised about the periphery of the top end portion of the core block. At the time of closing the mold, the upper free end portion of the synthetic resin made tubular member having inserted thereinto the core block is bent inwardly along the interior surface of the cavity mold defining the conical portion molding section and urged by the annular flange against the interior surface of the cavity mold.

Further objects and features of the present invention will become apparent from the following detailed description of preferred embodiments thereof when taken in conjunction with the accompanying drawings, in which:

BRIEF DESCRIPTION OF THE DRAWINGS

FIG. 3 is a sectional view illustrating a first embodiment of the tubular container molding apparatus of the present invention; and FIG. 4 is an enlarged sectional view illustrating a part of a second embodiment of the molding apparatus of the present invention.

DETAILED DESCRIPTION OF THE INVENTION

Figure 1:
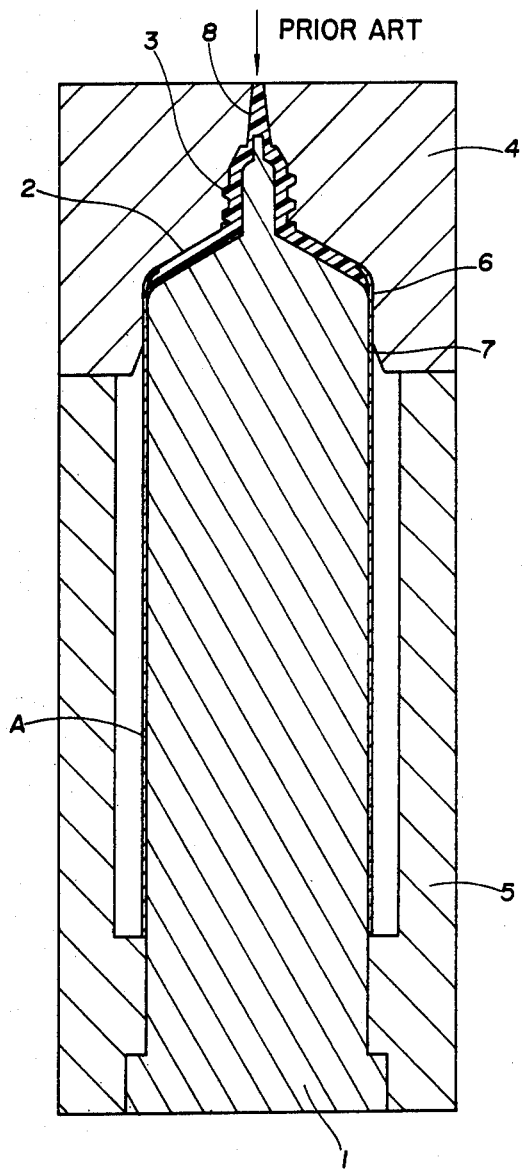
FIG. 1 is a sectional view showing a conventional tubular container molding apparatus.
Figure 2:
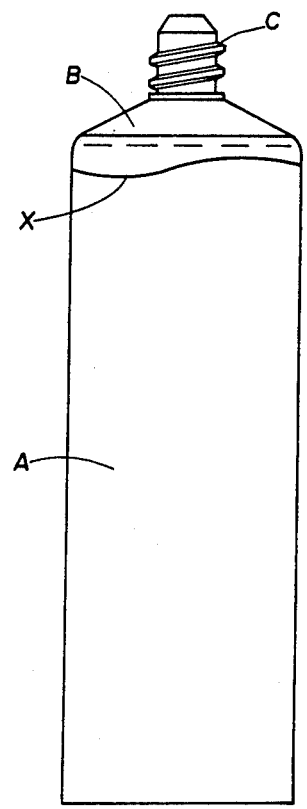
FIG. 2 is a perspective view showing a tubular container molded through the use of the prior art molding apparatus.

A description will be given, with reference to FIGS. 3 and 4, of preferred embodiments of the present invention. FIG. 3 is a sectional view illustrating a first embodiment of molding apparatus for use with the tubular container molding method of the present invention. The molding apparatus comprises a substantially cylindrical core block 10 for defining the interior of the container, a cavity mold 12 disposed on the top of the core block 10 to define therebetween an air gap 11 and a core clamping block 13 assembled with the core block 10 to cover it so that the center axes of the core block 10 and the cavity mold 12 may be aligned with each other.

The air gap 11 includes a resin injecting runner 14 and container neck and conical portion molding sections 15 and 16 defined by the core block 10 and the cavity mold 12. The runner 14 is formed to pass through the cavity mold 12. The interior surface of the cavity mold 12 corresponding to the neck portion molding section 15 has formed therein a female screw so that a male screw may be formed on the neck portion of the container for threaded engagement with a cap. Furthermore, the interior surface of the cavity mold 12 corresponding to the conical portion molding section 16 is formed so that the conical portion of the container may have a gentle slope, and the cavity mold 12 has a guide portion 17 which has a steep slope running down from the lower edge of the conical portion molding secton 16.

The core block 10 has an annular flange 18 raised about the periphery of its gently sloped upper end surface. Upon closing of the mold during the molding of the tubular container, the annular flange 18 urges against the lower marginal portion of the conical portion molding section 16 of the cavity mold 12 the synthetic resin made tubular member, the upper free end portion thereof which is bent inwardly to extend along the conical portion molding section 16 when the tubular member having inserted thereinto the core block 10 is pressed against the cavity mold 12. Besides, the annular flange 18 serves to prevent molten resin injected into the air gap 11 from flowing down between the core block 10 and the tubular member.

Next, a description will be given of the method of molding the tubular container through the use of the apparatus described above. At first, the core block 10 is inserted into a tubular member A performed of a synthetic resin as of the olefine series to have a predetermined length and diameter, which will ultimately form the container body. In this case, the upper end portion of the tubular member A is held to slightly project upwardly of the annular flange 18 of the core block 10. Then the mold is closed and, at this time, the projecting end portion of the tubular member A is pressed against the slope of the cavity mold 12 and is bent inwardly. The inwardly bent portion forms a flange-like shoulder portion 19 of the container. By further pressing the core block 10 against the cavity mold 12, the upper marginal portion of the tubular member A is firmly gripped between the annular flange 18 of the core block 10 and the conical portion molding section 16 of the cavity mold 12. Next, molten resin compatible with the synthetic resin of the tubular member A is injected from the runner 14 into the air gap 11 to soften the container shoulder portion 19 by the heat of the molten resin, thus forming the container conical and neck portions and as a unitary structure with the shoulder portion 19. After the resin is cooled to be soldified, the core block 10 and the cavity mold 12 are disassembled, thus obtaining the tubular container.

As described above, according to the present invention, the molten resin is injected after the container shoulder portion 19 is firmly gripped between the annular flange 18 of the core block 10 and the conical portion molding section 16 of the cavity mold 12 and the annular flange 18 serves as a barrier against the molten resin, so that even if the resin injection pressure were to be increased, the resin would not flow down beyond the annular flange 18, unlike the case of the conventional molding method.

An increase in the resin injection pressure improves the adhesive strength between the shoulder portion 19 and the conical portion of the container and, further, ensures high quality without lowering productivity even in the case of molding a number of tubular containers at a time.

FIG. 4 illustrates another embodiment of the tubular container molding apparatus of the present invention. This embodiment is essentially identical in construction with the above-described first embodiment except that an annular flat portion 20 is provided between the gently sloping conical portion molding section 16 and the steeply sloping guide portion 17 of the cavity mold 12, and that the edge of the annular flange 21 raised about the periphery of the gently sloped upper end surface of the core block 10 is formed flat as indicated by 22 in FIG. 4. As shown in FIG. 4, in this embodiment, the container shoulder portion 19 is held flat between the flat portion 20 and the flat top surface 22 of the flange 21, and the top end portion of the tubular member A is buried in and molded with the conical portion 16. This not only further improves the adhesive strength between the conical portion and the shoulder portion 19 of the container, but also insures that the width of the portion of the tubular member A forming the shoulder portion 19 is always fixed regardless of the slight variations in the length of the tubular member A.

As has been described, according to the present invention the resin can be injected into the cavity mold in such a state that the upper marginal portion of the tubular member forming the shoulder portion of the container is firmly held between the cavity mold and the core block. This not only completely prevents the formation of the aforementioned wavy curve by the molten resin flowing down the conical portion molding section of the cavity mold, unlike in the prior art, but also makes it possible to raise the resin packing pressure. Accordingly, it is possible to increase the adhesive strength between the tubular member and the injected resin and to mold tubular containers of stable quality while at the same time maintaining high productivity.

Although the present invention has been described with reference to the preferred embodiments thereof, many modifications and alterations may be made within the spirit of the present invention.

What is claimed is:

1. A tubular container molding method comprising the steps of:
    inserting a substantially cylindrical core block, including a gently sloped upper surface and an annular flange raised about the periphery of said upper surface and having a flat upper edge, into a tubular member formed of synthetic resin material as a container body to have a predetermined length and diameter, with an upper marginal portion of said tubular member being projected upwardly beyond said annular flange;
    closing over said core block a cavity mold including a gently sloped lower surface, a steeply sloped guide surface and an annular flat portion formed between said lower surface and said guide surface, thereby defining container conical and neck portion molding sections in an air gap between said core block and said cavity mold;
    during said closing of said cavity mold, pressing said upper marginal portion of said tubular member against said annular flat portion of said cavity mold by said annular flange of said core block, to thereby inwardly bend said upper marginal portion to form a flange-like shoulder portion;
    tightly holding said shoulder portion between said flat upper edge of said annular flange and said annular flat portion, with an end portion of said shoulder portion projecting into said conical portion molding section;
    injecting molten synthetic resin material compatible with the material of said tubular member into said container conical and neck portion molding sections, thereby to mold a neck portion and a conical portion of the container with said end portion of said shoulder portion being embedded in said conical portion and fused together; and
    disassembling said core block and said cavity mole after cooling said molten resin.

2. A tubular container molding apparatus comprising:
    a substantially cylindrical core block for defining the interior of a container and for insertion into a tubular member, said core block including a gently sloped upper surface and an annular flange raised about the periphery of said upper surface, said annular flange having a flat upper edge;
    a cavity mold for defining in cooperation with said core block container conical and neck portion molding sections in an air gap therebetween, said cavity mold including a gently sloped lower surface, a steeply sloped guide surface and an annular flat portion formed between said lower surface and said guide surface;
    said annular flange of said core block and said annular flat portion of said cavity mold defining means for, upon said cavity mold being closed over said core block, causing an upper marginal portion of the tubular member to be bent inwardly to define a flange-like shoulder portion, and for tightly holding the shoulder portion such that an end portion thereof projects into said conical portion molding section; and
    means for enabling the injection into said container conical and neck portion molding sections molten synthetic resin material compatible with the material of the tubular member, thereby to mold neck and conical portions of the container with the end portion of the shoulder portion being embedded in the conical portion and fused together.

* * * * *